No. 771,698. PATENTED OCT. 4, 1904.
J. W. BISHOP.
ROAD SCRAPER.
APPLICATION FILED JUNE 9, 1904.
NO MODEL.
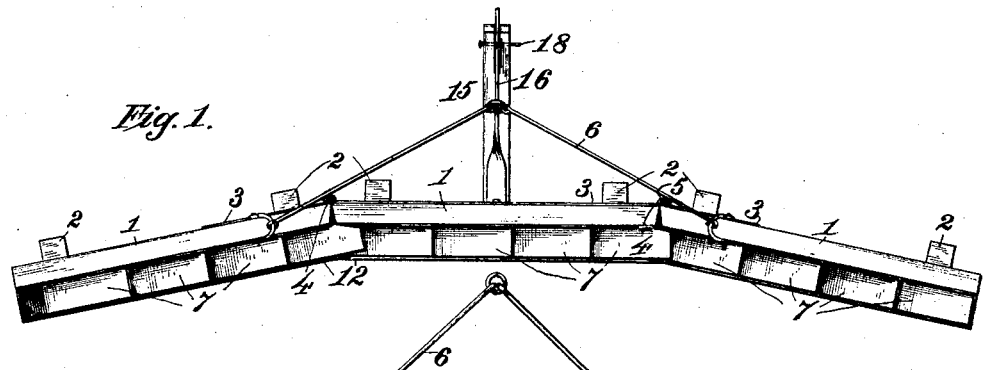
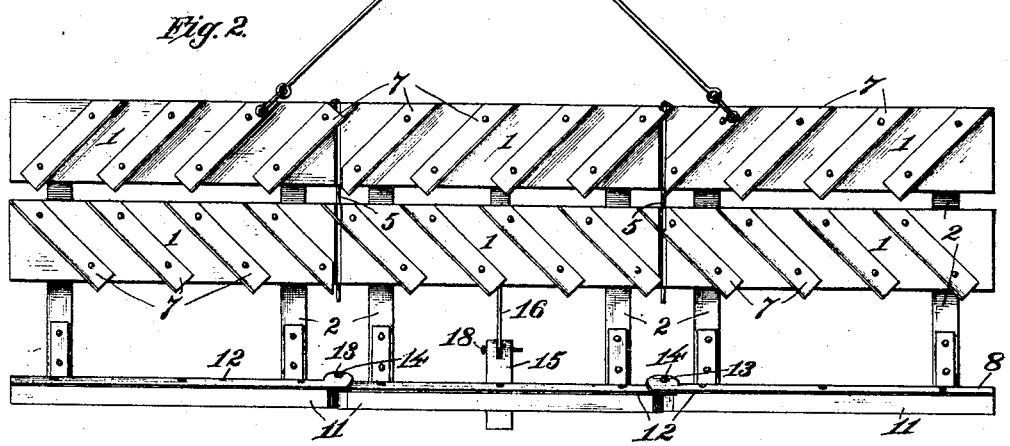
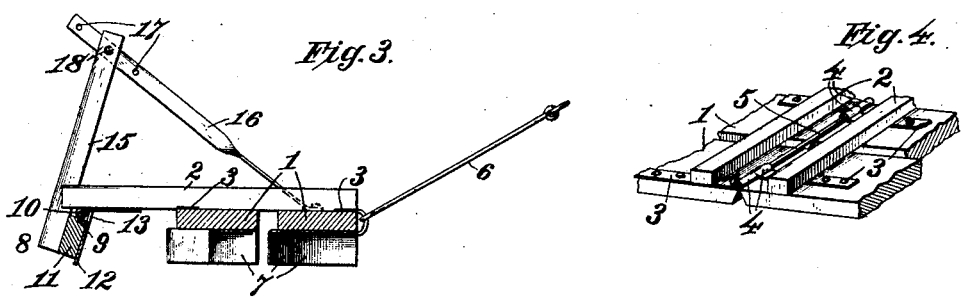
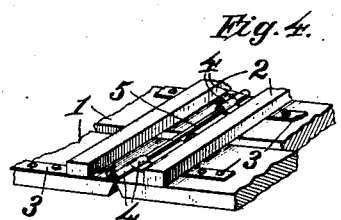
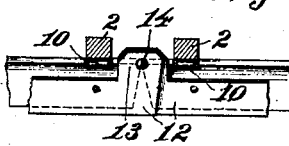
WITNESSES:
H. S. Austin
C. D. Davis
INVENTOR
Jacob W. Bishop
BY
R. W. Bishop
ATTORNEY No. 771,698.                                           Patented October 4, 1904.

UNITED STATES PATENT OFFICE.

JACOB W. BISHOP, OF WASHINGTON, IOWA.

ROAD-SCRAPER.

SPECIFICATION forming part of Letters Patent No. 771,698, dated October 4, 1904.

Application filed June 9, 1904. Serial No. 211,775. (No model.)

*To all whom it may concern:*

Be it known that I, JACOB W. BISHOP, a citizen of the United States of America, residing at Washington, in the county of Washington and State of Iowa, have invented certain new and useful Improvements in Road-Scrapers, of which the following is such a full, clear, and exact description as will enable others skilled in the art to which it appertains to make and use the same, reference being had to the accompanying drawings, forming a part hereof.

My invention relates to devices for leveling or smoothing road-beds; and it consists in certain novel features hereinafter first fully described and then particularly pointed out in the claims.

In the accompanying drawings, which fully illustrate my invention, Figure 1 is a front elevation of the device. Fig. 2 is a bottom plan view of the same. Fig. 3 is a transverse vertical section thereof. Fig. 4 is a detail view showing the connection between the sections of the frame, and Fig. 5 is a detail view showing the connection between the sections of the rear scraper.

The frame of the device is constructed in sections, each section consisting of broad beams 1 and bars 2, secured on the upper sides of and connecting the said beams. On the upper sides of the beams 1, at the ends of the same, I secure the straps 3, having eyes 4 at their ends through which are inserted the hinge or pivot pins 5, whereby the sections of the frame are secured together so that they cannot separate horizontally across the road-bed, but may oscillate vertically to accommodate themselves to inequalities of the road-bed or to form approximately an arc which will correspond to the grading desired to be imparted to the road. In the form of the device shown a draft device 6 is flexibly secured to the front edge of the end sections of the frame; but the frame may be attached to one of the trucks now in common use, if so desired.

On the under sides of the sections of the beams 1 I secure the depending scrapers or blades 7, which are arranged diagonally across the beam. As shown in Fig. 2, a series of these blades are arranged on each beam, the blades on each beam being parallel with each other and those on the rear beam being at an angle to those on the front beam, so that they turn the loose dirt to opposite sides of the road.

The bars 2 project rearward beyond the beams 1, and to the rear ends of the said bars I secure a scraper 8, which extends across the machine at right angles to the line of travel of the same. This scraper 8 is hinged to the bars by means of eyes or rods 9, secured in the upper edge of the beam of the scraper and passing through the eyes or bights of straps 10, secured to the under sides of the bars 2. This scraper consists of beams 11, hinged to the bars 2, as just described, and having their inner ends disconnected, and a scraper-blade 12, also made in sections and secured to the front sides of the beams 11 and projecting below the bottom edge of the same. The meeting ends of the sections of the scrapers are formed with upwardly-extending ears or offsets 13, through which pivot-pins 14 are inserted to secure the sections together and permit them to move vertically with respect to each other, so as to follow the movements of the sections of the frame. The ends of the sections overlap, so that a continuous scraping edge will be presented in all positions of the scraper. Rising from the central section of the rear scraper is a standard 15, having a bifurcated upper end, and extending upward and rearward from the central section of one of the beams 1 is a brace 16, having its end provided with a series of openings 17 and adapted to pass through the bifurcated end of the standard 15. A locking-pin 18 is inserted through the end of the standard and one of the said openings 17 to secure the standard and the rear scraper at any desired angle.

The construction and arrangement of the several parts of the device being thus made known, it is thought the operation and advantages of the device will be readily understood.

Draft is applied through the draft device and the device is drawn over the road, the scrapers acting successively to cut down the ridges in the road and turn the surplus dirt into the hollows between the ridges, so as to leave the surface of the road smooth throughout. The diagonally-arranged scrapers turn the dirt first to one side and then to the other, so that the lateral draft is equalized and any tendency of the device to move to one side or the other of the road is overcome. The dirt escapes past the end of the scrapers, and the surplus which does not pass immediately into the hollows will be left loose on the surface; but it will be pushed forward by the rear scraper, and its tendency to escape under the edge of the same will cause it to be spread evenly over the surface. This rear scraper may be adjusted to and held at any desired angle, according to the nature of the soil or other circumstances of the work.

The device being constructed in sections hinged together will readily accommodate itself to and pass over any unusual obstructions in the road, and the grade given the road-bed for drainage purposes will not be destroyed, as the outer or end sections will naturally swing downward, so as to follow the transverse surface-line of the road-bed.

Having thus described my invention, what I claim, and desire to secure by Letters Patent, is—

1. A road-scraper provided with two sets of scraper-blades arranged diagonally of the frame and at an angle to each other, both sets of scrapers extending entirely across the frame.

2. A road-scraper having two sets of blades arranged at an angle to each other and diagonally of the frame, both sets of blades extending entirely across the frame and a rear scraper arranged at right angles to the line of travel of the scraper and presenting a continuous scraping edge.

3. A road-scraper having a blade presenting a continuous scraping edge and consisting of sections hinged together.

4. In a road-scraper, the combination of the frame consisting of sections hinged together at their ends, and a scraper hinged to the frame and also consisting of sections hinged together at their ends.

5. A road-scraper consisting of a frame formed in sections hinged together, diagonally-arranged blades on the under side of the frame, said blades being in two series at an angle to each other, a scraper hinged to the rear of the frame and consisting of sections hinged together at their ends, and means for holding said scraper at an angle to the frame.

In testimony whereof I have signed this specification in the presence of two subscribing witnesses.

JACOB W. BISHOP.

Witnesses:
MARSH W. BAILEY,
EDMUND D. MORRISON.